United States Patent Office 3,111,298
Patented Nov. 19, 1963

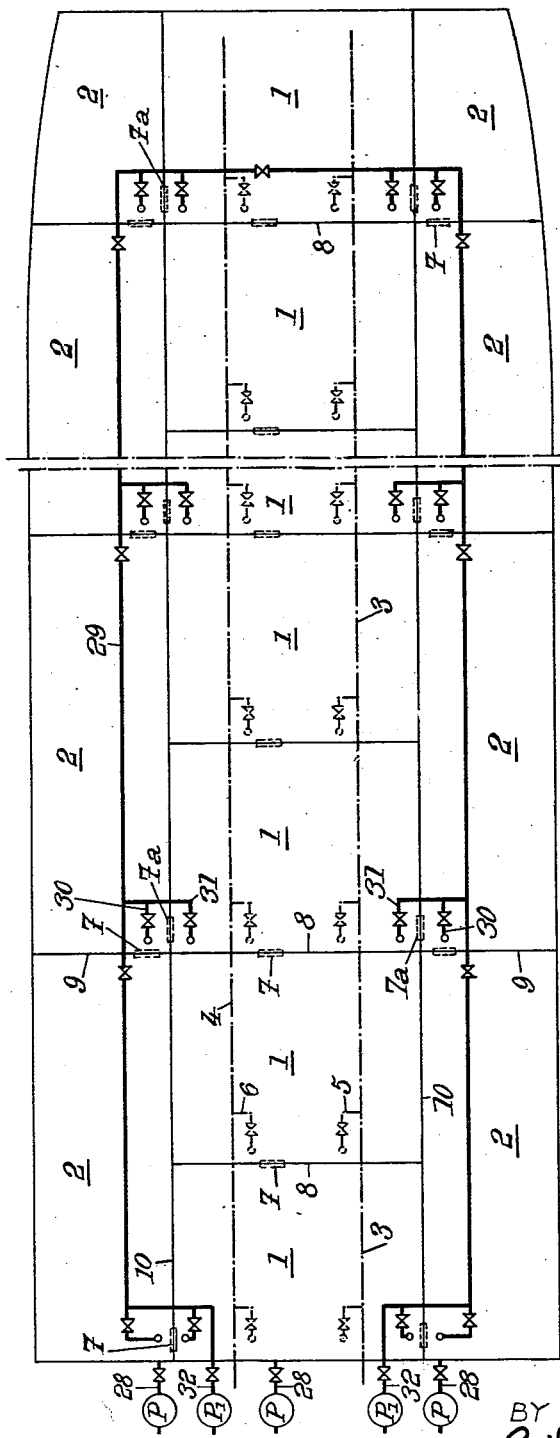

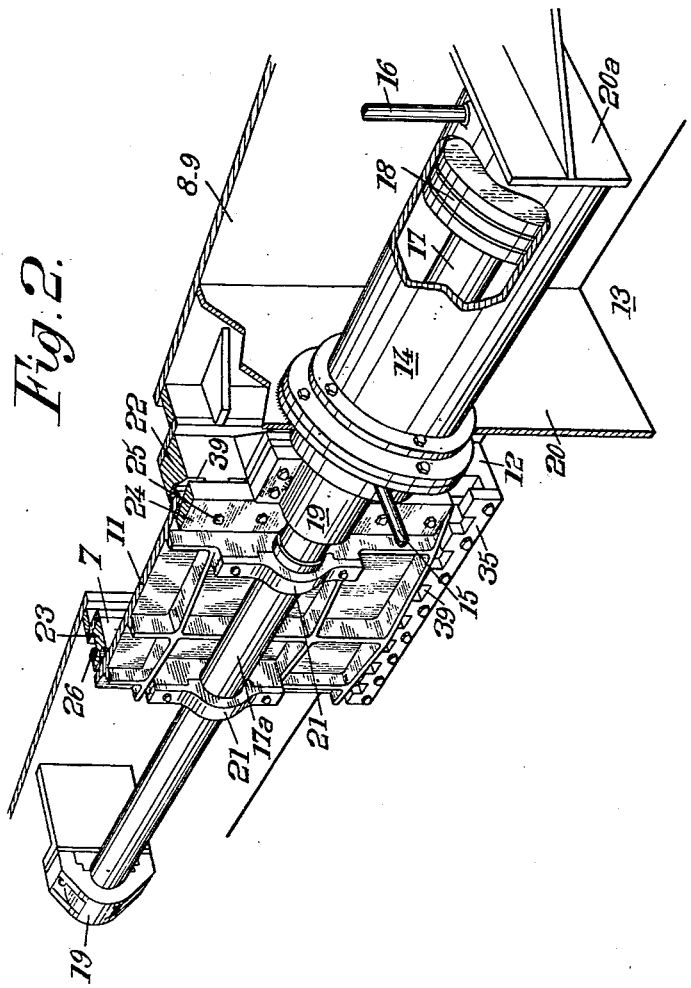

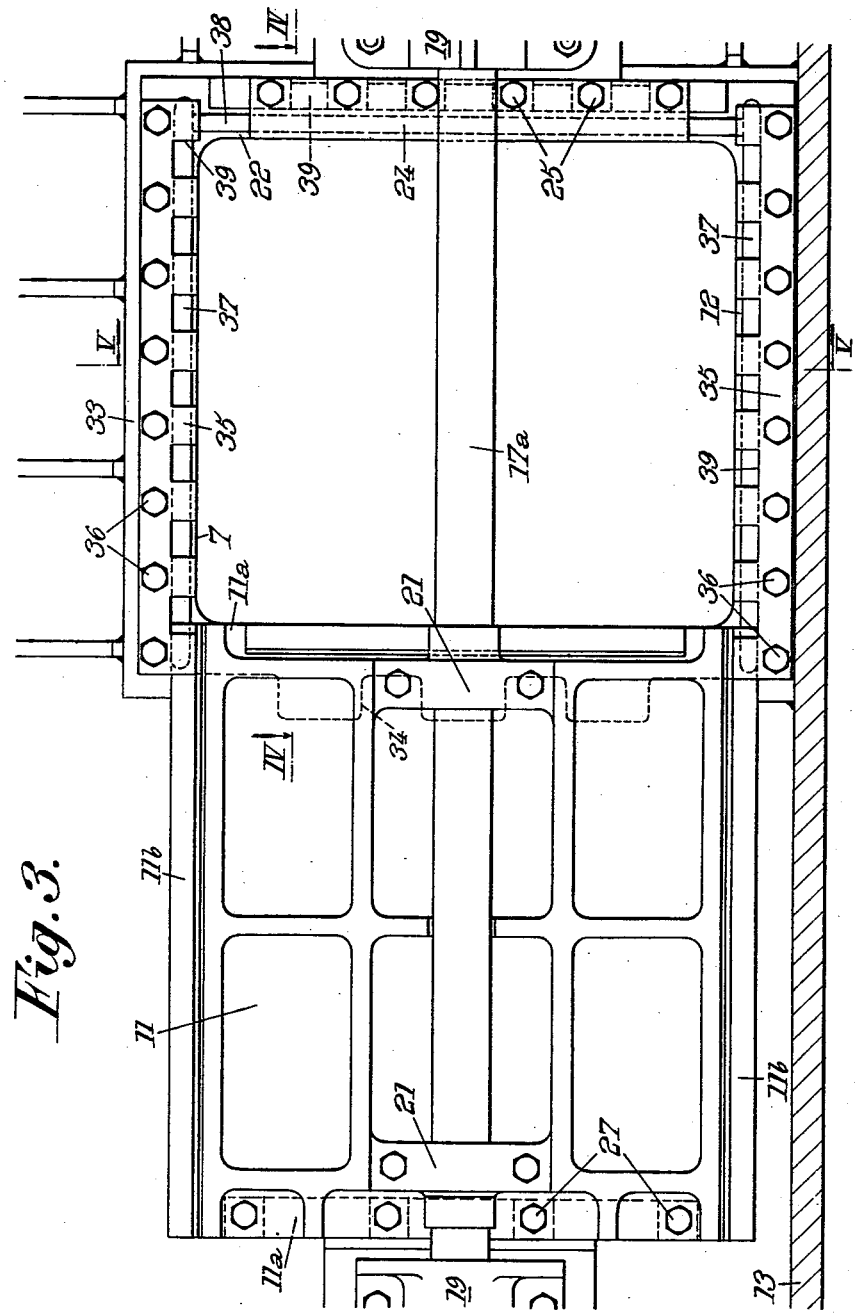

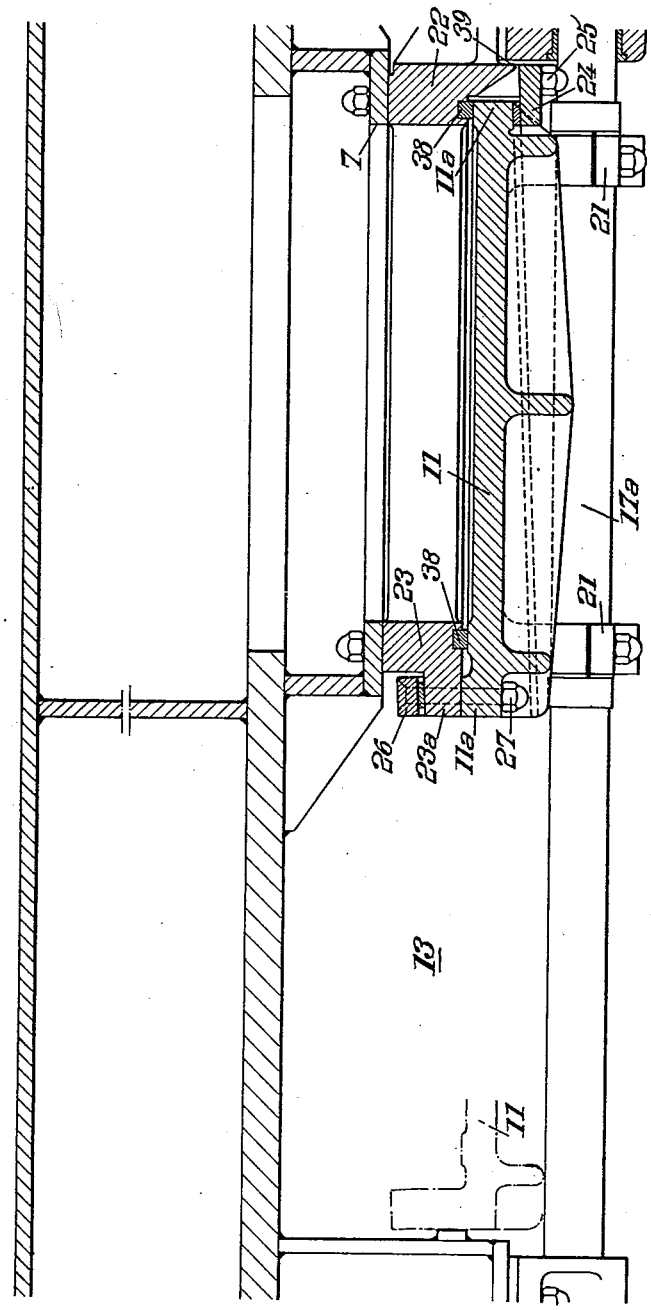

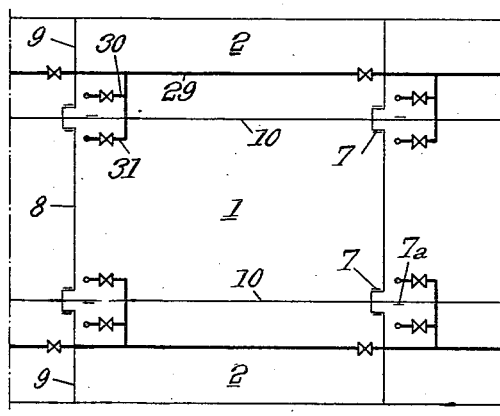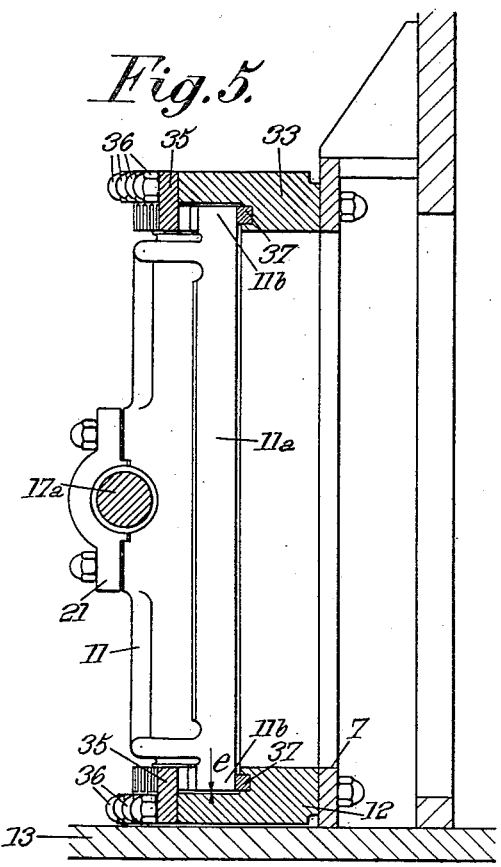

3,111,298
PISTON OPERATED WEDGE TYPE GATE VALVE
René Gasquet, Neuilly-sur-Seine, France, assignor to Societe Industrielle Generale de Mecanique Appliquee S.I.G.M.A., Paris, France, a society of France
Filed June 3, 1960, Ser. No. 33,841
Claims priority, application France June 6, 1959
3 Claims. (Cl. 251—62)

The present invention relates to oil tankers the tanks of which are limited vertically by longitudinal and transverse bulkheads, these ships transporting in said tanks either a cargo consisting of oil or sea water acting as ballast.

Usually the inflow or outflow of the cargo or of the ballast takes place through a piping including suction pipes in each tank, a valve mounted on each pipe, suction means which extend through the transverse bulkheads and on which said pipes are branched, main pumps or suction pumps and drying pumps placed as low as possible, inflow and outflow conduits and other mains extending above the main deck of the ship with fixation means for the flexible pipes serving to loading or unloading. The position of said suction and drying pipes is determined according to the possible variations of the trim and of the list of the ship. These variations thus determine the location of the pump chamber, which is generally provided at the rear of the system of tanks. High rates of flow lead to the use of main pumps of the centrifugal type the drawback of which lies in their poor suction characteristics, the possibilities of failure and cavitation being made worse by the fact that the bottom mains on which they are branched are located at some height above the bottom so as to eliminate the risk of weakening the metallic framework and to permit the fixation of these pumps, their maintenance and their replacement if necessary.

The bottom mains the function of which is to ensure a high rate of flow when the main pumps are sucking in or delivering liquid constitute, with their expansion joints, the valves, the pipes and the supports, an important weight and a high expense and they require during the life of the ship costly maintenance and replacement.

The object of the present invention is to avoid these drawbacks.

For this purpose, according to the present invention, the lower portions of the transverse bulkheads, and preferably also of at least some of the longitudinal bulkheads are provided with door openings of large dimension adapted to be closed by valves operable from the outside of the tanks. Furthermore a high capacity pump or main pump advantageously of the centrifugal type is branched on one of said tanks so that when the tanks are being emptied (or filled) liquid can flow to (or from) the pump at least in the longitudinal direction of the ship inside said tanks and from one of said tanks to the other through said door openings.

The drying means, which if necessary are slightly larger than those of conventional systems, may be kept in order to perfect the drying proper by means of suitable pumps and to perform movements between tanks, displacements of heterogeneous cargoes and other special movements. The invention therefore permits of at least partly eliminating the bottom mains, valves, supports, passages, suction pipes and so on, due to their replacement by valves in the bulkheads. This ensures a reduction of the weight of the tanker and of the cost of building and maintaining it, an increase of the flow rate of the pumps for a given power absorbed by them or a reduction of the power necessary for operating these pumps to obtain a given rate of flow, a reduction of the time necessary for loading and unloading the tanker and simplification of the operations.

Said main pump is preferably branched on one of the rear tanks of the ship, an individual pump being advantageously provided for each of the rear central and lateral tanks.

Such a location of the pumps makes it possible to keep them in operation during the whole time of unloading if care is taken, as it is common practice, to give the ship a positive trim (the front part of the ship being lifted), by first opening all the doors of the transverse bulkheads located amidship and also the doors of only the longitudinal bulkheads located at the front of the ship and which serve to connect the lateral tanks with the central tanks.

The doors advantageously have a horizontal rectilinear sill which is of course located as low as possible so that the section of flow of the liquid remains as large as possible when the free level of the liquid is close to this still, said doors being advantageously of rectangular shape.

Furthermore advantageously the valves are guided in such manner as to slide horizontally from their closing position to their full opening position so that the foreign substances present in the liquid at the bottom of the tanks have no tendency to be crushed by the valve but are on the contrary pushed horizontally, which improves liquid tightness.

In order to obtain a liquid tight fitting of the valve on the corresponding portions of the doors, a wedging engagement is preferably provided between the valve and the door frame. Thus, the valves, which must be perfectly reliable but which work in crude petroleum containing a lot of impurities, have a self-cleaning action.

Every valve may be actuated by a piston the rod of which is guided horizontally and the valve is fixed to the rod through means which permit some transverse displacement of the valve with respect to the piston rod, so as to permit the above mentioned wedging engagement. Finally, every valve is advantageously hanged vertically to the above mentioned piston rod so that its lower horizontal edge is kept at some vertical distance from the corresponding portion of the door frame, which further reduces the risk of bad operation of the doors due to the depositing of impurities.

Preferred embodiments of the present invention will be hereinafter described with reference to the accompanying drawings, given merely by way of example and in which:

FIG. 1 is a diagrammatic plan view of an oil tanker made according to the invention.

FIG. 2 is a diagrammatic perspective view on an enlarged scale of one of the doors with the control device thereof.

FIG. 3 shows, also on an enlarged scale, the door of FIG. 2 in elevational view, said door being open.

FIG. 4 is a horizontal section on the line IV—IV of FIG. 3, the door being closed.

FIG. 5 is a vertical sectional view on the line V—V of FIG. 3, the door being open.

FIG. 6 shows a modification of the system of FIG. 1.

The tanker partly illustrated by the drawings contains central tanks 1 (ten for instance) and lateral tanks 2 (ten for instance), the twenty tanks having volumes of the same order of magnitude.

Transverse bulkheads 8 form partitions between the central tanks 1 and transverse bulkheads 9 form partitions between the lateral tanks 2, whereas longitudinal bulkheads 10 separate the central tanks from the lateral tanks.

At the bottom of the tanks, the system generally used up to now comprises bottom mains 3 and drying mains 4 extending through the transverse bulkheads and connected respectively (at the rear, that is to say in the left hand portion of FIG. 1) to the main pumps (generally of the centrifugal type) and to the drying pumps having a lower capacity. At the rear corners of every central tank 1, there are respectively provided a suction pipe 5 and a drying pipe 6. FIG. 1 shows, in dot-and-dash lines, the piping of the central tanks of a conventional oil tanker. Of course, such a tanker includes analogous piping means for the lateral tanks.

According to the invention, the mains such as 3 and the corresponding pipes 5 are replaced by openings 7 provided in the transverse bulkheads 8 and 9 and door openings 7a provided in the longitudinal bulkheads 10 so that the respective tanks can be placed into or out of communication with one another, these door openings being located in the lower portion of the bulkheads.

As shown by FIG. 1, a door opening 7 may be provided in the middle part of every central transverse bulkhead 8, a similar door opening in the portion of every lateral transverse bulkhead 9 closer to the axis of the ship and a door opening 7a at the rear end of every longitudinal bulkhead 10. A pipe 28 adapted to be connected to a high capacity centrifugal pump P is branched on each of the rear tanks. The piping further includes a drying main 29 connected to each of the lateral tanks 2 through a pipe 30 and to every second central tank 1 through a pipe 31, the rear ends 32 of this main 29 being connected to drying pumps $P_1$.

FIGS. 2 to 5 show an advantageous construction of a door opening 7 (or 7a) and of the corresponding valve 11. Such a door opening is limited at the bottom by a horizontal base plate 12 of rectilinear shape, at the top by a cross piece 33 and on the sides by uprights 22 and 23. The horizontal sill 12 is supported by the corresponding bulkhead but is independent of the ship bottom 13 so as not to weaken it and it is located at a height as small as possible so as to facilitate the flow of liquid from one tank to the other.

The dimensions of valve 11 must be sufficiently great to permit a high flow rate of liquid through the door opening but sufficiently small so that its presence does not make it necessary to destroy, even locally, the metallic framework of the ship when an already existing ship is to be modified. By way of example, the door openings may be of rectangular shape having sides of 800 mm. and 1000 mm. or of square shape with sides of 800 mm.

Valve 11 is actuated by a hydraulic motor 14 provided with conduits 15 and 16 which may act alternately as feed pipe and discharge pipe.

The rod 17 of the hydraulic motor, which is rigid with piston 18, carries an extension 17a guided horizontally in bearings 19. The motor is supported horizontally between a plate 20 and a bracket 20a. Valve 11 is connected to rod extension 17a through fixation means 21.

In order to obtain a liquid tight closing of the door opening 7 by valve 11 a wedging engagement is provided between the vertical edges 11a of the valve and the vertical uprights 22 and 23 which limit the door opening 7 and also between the horizontal edges 11b of the valve and respectively sill 12 and cross piece 33, fixation means 21 having for this purpose some slight radial play with respect to rod extension 17a so that these means 21 and consequently valve 11 can have limited horizontal transverse displacements with respect to the door frame.

For this purpose, there is provided in vertical upright 22, which is closer to the hydraulic motor 14, a vertical groove formed between the upright 22 proper and a piece 24 fixed on this upright by bolts 25. Piece 24 has a bevelled horizontal cross-section, i.e. the face thereof intended to cooperate with the vertical edge 11a of the valve is oblique so as to wedge said edge 11a against upright 22 when the valve is caused to slide toward the right. As for the other upright 23, it is provided with a wedged edge 23a and the corresponding vertical edge 11a carries a vertical piece 26 fixed opposite said edge by means of bolts 27, the faces of this edge 11a and of piece 26 that are turned toward each other being inclined with respect to each other in the same manner as the respective faces of the wedge-shaped edge 23a so as to fit thereon when the valve is caused to slide toward the right. Notches 34 are of course provided in the edge 23a of upright 23 for the passage of bolts 27 during the horizontal sliding movements of valve 11.

Likewise, sill 12 and cross piece 33 may be each provided with a groove the edges of which converge toward the right, one wall of said groove being formed by said sill or by said cross piece and the other one by a wedging piece 35 fixed to the bulkhead by means of bolts 36. Advantageously, as shown, said wedging pieces are provided with a multiplicity of notches for the passage of impurities contained in oil as long as valve 11 has not been wedged by said pieces 35 against the edges of door opening 7.

Liquidtight packing means consisting of two horizontal strips 37 and two vertical strips 38 improve liquidtightness when the door is closed.

The door frame, constituted by vertical uprights 23 and wedges 24, by sill 12 and the lower wedge 35 and by cross piece 33 and the upper wedge 35, comprises at intervals lateral openings 39 for evacuating the impurities pushed by valve 11 on every operation thereof.

The risks of defective operation due to the impurities are further reduced by the fact that the valve is held by rod 17a at a distance e above the vertical face of sill 12.

It will be understood that, when power fluid is fed to hydraulic motor 14 through conduit 15, its piston 18 moves toward the right (FIGS. 2 to 4) and drives valve 11, which is thus wedged against liquidtight packing means 37 and 38. On the contrary, when liquid is fed to the motor through conduit 16, piston 18 moves toward the left and in view of the fact that the area upon which the power liquid (oil) under pressure is acting in this direction is greater than in the other direction (due to the non negligible cross section area of rod 17), an unwedging force is obtained which is slightly greater than the wedging force precedingly used for closing the valve.

Of course, the tanks are not necessarily arranged as shown by FIG. 1. For instance, they may be arranged as shown by FIG. 6. In this case, the number of lateral tanks 2 is equal to twice that of the central tanks 1. Furthermore the door openings 7 of the transverse bulkheads 8 and 9 are parallel to the door openings 7a of the longitudinal bulkheads 10, that is to say parallel to the vertical fore-and-aft plane of symmetry of the ship, two door openings 7 being provided in every transverse bulkhead 8, which permits of grouping in an advantageous manner the hydraulic control means for the respective door openings.

In a general manner, while I have, in the above description, disclosed what I deem to be a practical and efficient embodiment of my invention, it should be well understood that I do not wish to be limited thereto as there might be changes in the arrangement, disposition and form of the parts without departing from the principle of the present invention as comprehended within the scope of the accompanying claims.

What I claim is:

1. A closure device for an oil tank which comprises, in combination, a first part consisting of a fixed vertical wall having a rectangular opening therein, said opening having two vertical edges and two horizontal edges, a second part consisting of a valve plate movably carried by said wall and parallel thereto, said valve plate being rectangular and dimensioned to cover said opening, means carried by said wall on either side of said opening for slidably supporting said valve plate for horizontal movement thereof with respect to said wall between a closing position where said valve plate is opposite said opening and an opening position where said valve plate clears said opening, means interposed between said wall and said valve plate for moving said valve horizontally with respect to said opening, said valve plate being movable, with a small amplitude of displacement, with respect to said supporting means in a direction transverse to said wall, and cooperating means rigidly carried by said valve plate and said wall respectively and extending over the four edges of said opening for tightly wedging said valve plate against both the horizontal and the vertical edges of said opening in response to the end of the horizontal movement of said valve plate bringing it into register with said opening, the wedging means carried by one of said two first mentioned parts forming channels into which are to be engaged the corresponding wedging means carried by the other of said two parts, said channels being in free communication with the opening when the valve plate is in opening position, and said channels being apertured to permit evacuation therefrom of the impurities contained in oil which would otherwise accumulate in said channels.

2. A closure device for an oil tank which comprises, in combination, a first part consisting of a fixed vertical wall having a rectangular opening therein, said opening having two vertical edges and two horizontal edges, a second part consisting of a valve plate movably carried by said wall and parallel thereto, said valve plate being rectangular and dimensioned to cover said opening, two horizontal bearings carried by said wall on either side of said opening, a horizontal rod slidable in said bearings and operatively connected with said valve plate for supporting it and transmitting horizontal movement thereto with respect to said wall between a closing position where said valve plate is opposite said opening and an opening position where said valve plate clears said opening, a hydraulic motor carried by said wall and operatively connected with said rod for moving it horizontally in said bearings, said valve plate being movable, with a small amplitude of displacement, with respect to said rod in a direction transverse to said wall, and cooperating means rigidly carried by said valve plate and said wall respectively and extending over the four edges of said opening for tightly wedging said valve plate against both the horizontal and the vertical edges of said opening in response to the end of the horizontal movement of said valve plate bringing it into register with said opening, the wedging means carried by one of said two first mentioned parts forming channels into which are to be engaged the corresponding wedging means carried by the other of said two parts, said channels being in free communication with the opening when the valve plate is in opening position, and said channels being apertured to permit evacuation therefrom of the impurities contained in oil which would otherwise accumulate in said channels.

3. A closure device according to claim 2 wherein said wall comprises a sill portion located under said valve plate when said valve plate is in closing position, the lower edge of said valve plate being then located at a small distance above said sill portion.

References Cited in the file of this patent

UNITED STATES PATENTS

| | | |
|---|---|---|
| 941,442 | Dornfeld | Nov. 30, 1909 |
| 1,112,647 | Outterson | Oct. 6, 1914 |
| 1,241,326 | Bartholomew | Sept. 25, 1917 |
| 1,302,547 | Heidenreich | May 6, 1919 |
| 1,779,637 | Phillips | Oct. 28, 1930 |
| 2,346,505 | Preuss | Apr. 11, 1944 |
| 2,397,155 | Rauch | Mar. 26, 1946 |
| 2,614,792 | Trefil | Oct. 21, 1952 |
| 2,710,586 | Shelton | June 14, 1955 |
| 2,793,002 | Kellar | May 21, 1957 |
| 2,842,283 | Smith | July 8, 1958 |
| 2,851,051 | Englert et al. | Sept. 9, 1958 |
| 2,898,932 | Tefs | Aug. 11, 1959 |
| 2,947,511 | McInnes | Aug. 2, 1960 |

FOREIGN PATENTS

| | | |
|---|---|---|
| 6,827 | Great Britain | June 4, 1885 |
| 209,166 | Great Britain | Jan. 3, 1924 |
| 349,072 | Great Britain | May 11, 1931 |
| 743,713 | Great Britain | Jan. 25, 1956 |
| 1,129,800 | France | Sept. 10, 1956 |
| 583,091 | Canada | Sept. 15, 1959 |
| 1,225,003 | France | Feb. 15, 1960 |